MAGNETIC INDUCTIVE DEVICE COMPRISING
A BODY OF INTERCONNECTED CONDUCTORS
HAVING MAGNETIC STATES

Original Filed Dec. 23, 1960 2 Sheets-Sheet 1

INVENTOR
A. H. BOBECK
BY
William H. Kamstra
ATTORNEY

Aug. 5, 1969 A. H. BOBECK 3,460,108

MAGNETIC INDUCTIVE DEVICE COMPRISING A BODY OF INTERCONNECTED CONDUCTORS HAVING MAGNETIC STATES

Original Filed Dec. 23, 1960 2 Sheets-Sheet 2

United States Patent Office 3,460,108
Patented Aug. 5, 1969

3,460,108

MAGNETIC INDUCTIVE DEVICE COMPRISING A BODY OF INTERCONNECTED CONDUCTORS HAVING MAGNETIC STATES

Andrew H. Bobeck, Chatham, N.J., assignor to Bell Telephone Laboratories, Incorporated, New York, N.Y., a corporation of New York Original application Dec. 23, 1960, Ser. No. 77,873, now Patent No. 3,214,742, dated Oct. 26, 1965. Divided and this application Mar. 1, 1965, Ser. No. 436,134
Int. Cl. G11b 5/12
U.S. Cl. 340—174 23 Claims

ABSTRACT OF THE DISCLOSURE

A magnetic inductive device performing a learning function is developed from a body of interconnected conductors having remanent states. An energizing circuit connected to first and second points in the body applies pulses which cause portions of the conductors between the first and second points to change from first remanent states to second remanent states and thereby change the impedance between the first and second points.

This application is a division of the copending application of A. H. Bobeck, Ser. No. 77,873, filed Dec. 23, 1960, now Patent Number 3,214,742 and describes an invention which relates to magnetic devices and circuits and particularly to such devices and circuits adapted to perform inductive and memory functions.

Magnetic flux saturation devices, both those of the square loop type and those having more linear hysteresis loops, have found wide application in the information handling and pulse switching arts. These devices have taken a number of forms and such structures as toroidal cores, apertured sheets, multileg flux steering structures and the like, have been usefully employed in a variety of contexts to perform specific switching and inductive functions. In each of these cases the magnetic structure conventionally serves as the core for various input, output, and control windings coupled therto in particular applications. Thus whether the core is of a square loop material and hence is capable of performing a memory function or whether a straight transformer action is accomplished, the various windings are controllably linked by flux appearing in the flux paths presented by the core structure. With the advent of magnetic wire memory elements a new mode of operation with respect to inductive devices is advantageously made possible. In a patent of the present inventor, No. 3,083,353, issued Mar. 26, 1963, a magnetic memory device is described which itself comprises one of its energizing and interrogation windings. The memory device is fabricated of an electrically conductive square loop magnetic material such that current pulses applied to the device are effective to cause flux changes therein, and conversely, when flux changes are caused in the device, differences of potential appear across separated points of the magnetic device itself. These potential signals may conventionally be detected by known circuit means.

Magnetic materials having the required electrical conductivity while at the same time exhibiting sufficiently rectangular hysteresis characteristics when a memory function is to be performed, have thus proven highly useful as exemplified in the aforecited patent. The availability of such magnetic materials has made possible improvements and modes of operation in both straight inductive circuits and those capable of a memory function not hitherto achievable. One highly important advantage to be gained from the employment of magnetic devices formed of an electrically conductive material is the reduction in size of the circuit incorporating the devices. Manifestly in prior art arrangements a limitation is imposed on the extent to which an inductive element may be reduced in size by the necessity of externally coupling windings thereto. The aperture of a torodial core, for example, must be sufficiently large to accommodate all of the energizing windings which the design of the incorporating circuit may dictate. Sufficient magnetic material must then also be available in which flux may be switched. Accordingly, a substantial reduction in the dimensions of a magnetic inductive element would make possible an advantageous reduction in the overall dimensions of the incorporating circuit. The increasing demand for miniaturization of electrical circuits also emphasizes the need for magnetic inductive elements of extremely small size regardless of their particular hysteresis properties.

Accordingly it is one object of this invention to achieve magnetic memory and inductance elements and circuits having advantages in terms of simplicity of fabrication and reduction in size not hitherto obtainable.

It is also an object of this invention to adapt magnetic materials exhibiting both electrical conductivity and substantially rectangular hysteresis characteristics to other new and novel magnetic inductive devices and circuits.

Still another specific object of this invention is to provide a novel inductance device for determining the correlation between two groups of random occurrences.

In accordance with the principles of this invention a magnetic medium comprises a large number of magnetic fibers or strands of an electrically conductive square loop material which are interwoven in a completely random fashion and closely packed to form a pad-like solid. Each of the strands of the maze of strands thus formed makes physical contact with one or more other strands. As a result, electrical and magnetic continuity may be traced from any one point in the pad to any one or unlimited number of other points in the structure by a virtually unlimited number of paths. According to this invention a plurality of input probes are provided in electrical contact with the strands of the structure at first random points. Another plurality of output probes are then provided also in electrical contact with the strands of the structure at second random points. It will be apparent from the internal physical contacts of the conductive magnetic strands of the structure with each other that a plurality of electrically conductive parallel paths will be available from each of the input probes to each and every one of the output probes.

An electrical circuit may thus be completed through the maze of magnetic strands from a selected one of the input probes to another selected output probe via many parallel paths as presented by interconnected segments of the strands. Manifestly, the paths will present varying resistances to a current as determined by the circuitry of the paths through the maze. Thus, the most direct path between the selected probes may be expected to carry the greatest current with the current values in the remaining paths progressively decreasing as the length of the paths increase and become more remote. Further, because of the wholly random interlacing of the strands, it will be apparent that the precise paths taken by such a current will be difficult if not impossible to identify. However, as will become clear hereinafter, in accordance with the principles of this invention the current paths thus described need not be positively defined.

When an initial excitation provided by a current pulse is applied to a selected one of the plurality of input probes the current will be conducted via parallel paths presented by the magnetic strands to the particular output probe which is included in the energizing circuit. The internal fields generated by an initial current pulse tend to drive the magnetic strands comprising the paths to remanent saturation in one direction. Since the magnitude of the fields so generated will vary as the current in the paths, it is clear that, although the connecting strands presenting the most direct path between the energized leads may be completely driven to saturation, more remote paths will be progressively less completely so driven. As a result of the remanent magnetizations thus induced by an initial current pulse, the impedance of the parallel paths to an immediately following current pulse of the same polarity will also vary depending upon the extent to which the strands of the paths were remanently saturated. The current values in the parallel paths during the application of this next following current pulse will vary depending upon the impedance presented in those paths. However, less completely saturated paths will at this time be driven further toward saturation. This operation will continue with each successive current pulse of the same polarity applied to the selected probes until the maximum number of magnetic strands of a conducting path complex have been fully remanently saturated. Preferred conducting paths will thus have been established through the maze of strands and these paths will remain due to the square loop properties of the magnetic strands. Importantly, some part of these preferred paths from the selected input lead to the selected output lead remain no matter how many or which other output leads also offer a circuit path.

The memory properties of the magnetic strands and their ability to provide a varying impedance control as generally described in the foregoing are advantageously combined to achieve a novel comparison circuit in one specific embodiment of this invention. The correlation between two groups of random occurrences within an information handling or data processing system, for example, may readily be determined thereby. The two groups of random occurrences control respectively a plurality of current pulse sources and a plurality of ground sources. As these sources are each randomly energized by the groups of random occurrences, particular conducting paths are "learned" through the maze of strands. The extent to which the paths are "learned" is determined by the frequency with which a conducting path is completed in the interconnected strands between particular current pulse sources and particular ground sources. As reiterative current pulses are conducted through a particular complex of parallel paths, more and more of the strands making up the complex of paths are remanently flux saturated with a corresponding decrease in impedance presented to subsequent current pulses of the same polarity. The particular current pulse sources and ground sources having the greatest, and progressively less, frequency of coincidence of energization, is then readily determined by successively applying voltage pulses of the same polarity as the current pulses to each conducting path in turn with each of the ground sources energized and observing the magnitudes of the currents induced in each of the paths to ground each time the voltage pulse is applied. After such an interrogation operation is completed, it will be evident that the particular current pulse source and ground source having the conducting path therebetween in which the current magnitude is the greatest will also be the sources having the greatest frequency of coincidence of energization.

Paths so "learned" through the maze of strands may also be effectively "unlearned." If a conducting path between a pulse source not previously energized and a ground source which was previously energized is traversed by a current pulse, the pulse will take parallel paths through the strands to that ground source by a path different than a previous current pulse traversed to the same ground source. A new route and a new complex of low impedance paths will be established through the maze of strands. The old path or paths will either be effectively erased or be overridden by alternate paths to the extent that the alternate paths present a lower impedance to subsequent current pulses.

Conducting paths through the strand maze may also be totally "unlearned" in another manner. It will be appreciated that, in the foregoing embodiment of this invention, the low impedance paths established in the maze of strands will remain only if the physcial relationship between the interconnected strands is held fixed. Obviously any physical distortion of the magnetic storage medium due to a dislocation of the strands or strand segments will effect the continuity of the electrical conducting paths traceable from an energized pulse source to an energized ground source. At the same time, the remanent flux in the dislocated strands will undergo changes as strands are disconnected and other strands are newly placed in physical contact. The impedance of the connecting paths will consequently also be totally and randomly changed due to the distortion in the magnetic medium.

With the principles of this invention thus generally described in the foregoing, one of the features thereof may also be generally described as the physical connection of an electrically conductive magnetic medium with a pair of energizing electrodes. Internal magnetic fields caused by a current applied to the electrodes induces a magnetic flux in the magnetic medium which may be employed for conventional inductive purposes, or, when the medium is of a magnetic material exhibiting substantially rectangular hysteresis properties, for memory purposes.

More specifically, it is a feature of this invention that a magnetic medium comprises a large number of magnetic fibers or strands of an electrically conductive magnetic material having substantially rectangular hysteresis characteristics, which strands are interwoven in a wholly random fashion. The physical contacts of the strands define a complex of conducting paths between any selected point in the medium to any one or a number of other selected points in the medium. As reiterative current pulses are applied between selected ones of the points, a complex of paths between the points is progressively more positively defined as successive current pulses traverse the paths as a result of the progressive remanent flux saturation of the strands making up the totality of the path complex between the selected points. As the impedance of the paths through the strands is decreased by the progressive magnetic saturation, the successively energized paths are established as the preferred paths between the selected points to subsequent current pulses applied thereto.

This invention together with the objects and features thereof will be better understood from a consideration of the detailed description of a specific illustrative embodiment thereof when taken in conjunction with the accompanying drawing in which.

Figure 1:
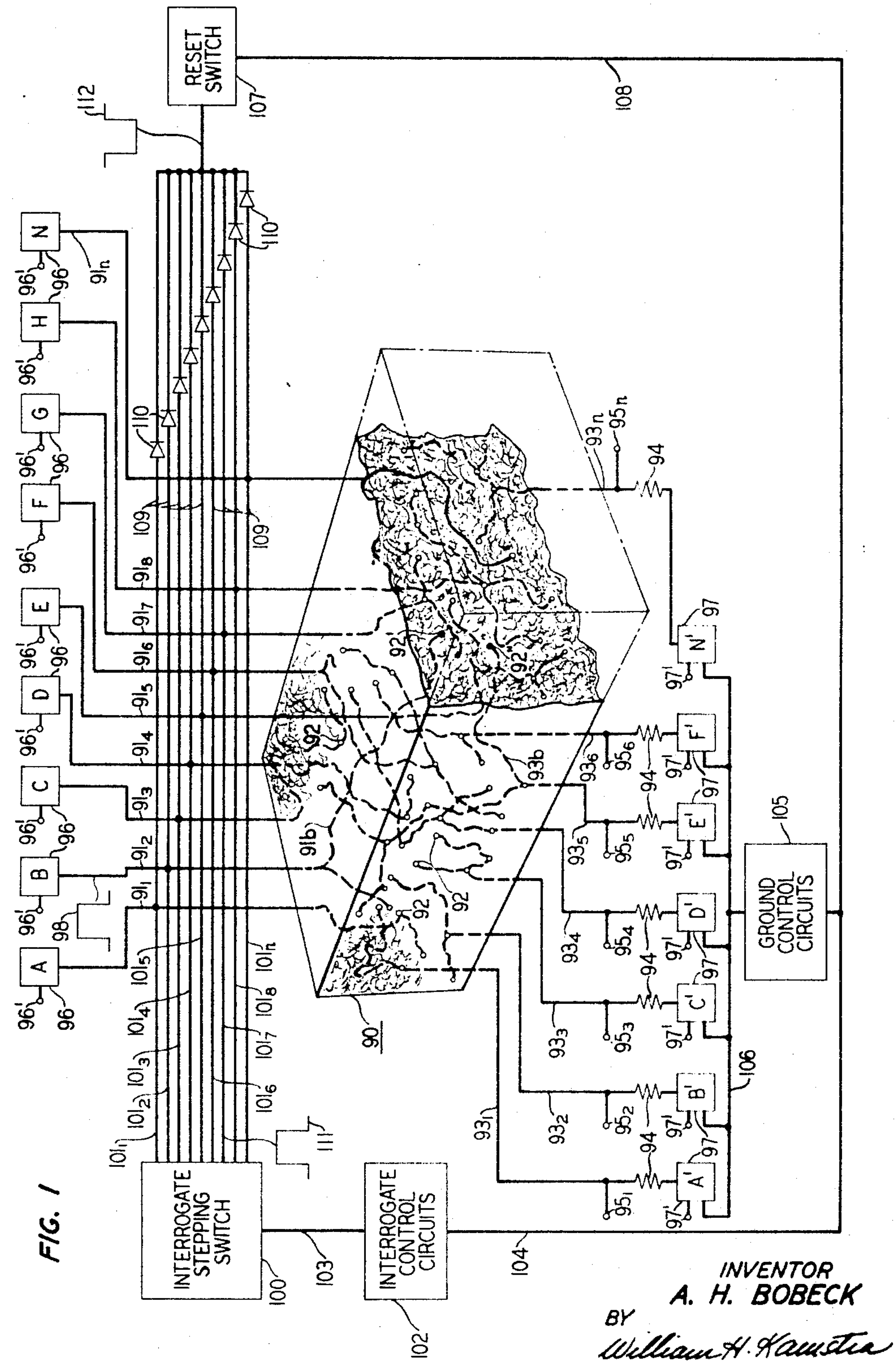
FIG. 1 depicts an illustrative embodiment of this invention comprising a comparison circuit for establishing the correlation between two groups of random occurrences.

In FIG. 1 is shown an embodiment of the principles of this invention comprising a novel memory arrangement for establishing correlations between groups of signal sources. The magnetic medium in this arrangement comprises a solid of electrically conductive, magnetic strands interwoven in a completely random fashion to realize a densely packed memory pad 90. The strands may be fabricated of 4–79 Moly-Permalloy magnetic, electrically conductive material having substantially rectangular hysteresis characteristics which is commercially available. In practice strands having a diameter range, for example, between 0.0001 and 0.01 inch will provide suitable impedance and flux switching characteristics. The randomly packed and interwoven strands in the pad 90 will be in physical contact at a large number of undetermined points and an electric current applied at one point would obviously be conducted to a ground point through a large number of undetermined parallel current paths presented by the interwoven strands. Interwoven with the magnetic strands and inserted at one side of the memory pad 90 are a plurality of probes $\mathbf{91}_1$ through $\mathbf{91}_n$. Each of the probes 91 is electrically insulated from each other and from the magnetic strands of the memory pad 90 except for one or more electrodes 92 affixed thereon making electrical contact with the strands at also wholly random points within the pad 90. The probes 91 may also be branched within the pad 90 in order to provide access from the entering side of the pad to substantially every area therein. Also interwoven with the magnetic strands and inserted at the other side of the memory pad 90 are a second plurality of probes $\mathbf{93}_1$ through $\mathbf{93}_m$. Each of the probes 92 is also electrically insulated from each other and from the magnetic strands of the memory pad 90 except for one or more electrodes 92 affixed thereon and in electrical contact with the strands at also wholly random points with the pad 90. The probes 93 may also be branched as are the probes 91 to provide access also from the entering side of the probes 93 to substantially every area of the pad 90. The memory pad 90 is shown as irregularly broken in FIG. 1 more clearly to show the internal organization of exemplary ones of the probes 91 and 93, their branches, and the affixed electrodes 92.

Each of the probes 93 has connected at the other end thereof an output load resistor 94 and is also connected to an output terminal 95. The other ends of the probes 91 are connected to a first group of pulse sources 96. Thus, the probes $\mathbf{91}_1$ through $\mathbf{91}_m$ are connected to pulse sources 96 specifically designated A through N, respectively. The other ends of the resistors 94 are connected to a second group of pulse sources 97. Thus, the resistors 94 connected at one end to the probes $\mathbf{93}_1$ through $\mathbf{93}_m$ are connected at the other ends to pulse sources 97, specifically designated A′ through N′, respectively. The probes 91 and 93 are also shown for these purposes as entering the pad 90 from opposite sides thereof. The principles of this invention however, contemplate any predetermined number of such probes entering the memory pad 90 from any side or angle whatever without regard to spacing, symmetry, or other order. Further, although the memory pad 90 is shown as being rectangular, the pad 90 may assume any shape or form whatever without affecting the principles of its operation.

Each of the probes 91 is also individually connected to an interrogate stepping switch 100 via a plurality of conductors $\mathbf{101}_1$ through $\mathbf{101}_n$. Interrogate control circuitry is further represented in connection with the embodiment of FIG. 1 by interrogate control circuits 102 connected by means of a conductor 103 to the interrogate stepping switch 100. During an interrogation operation the interrogate control circuits 102 also control, via a conductor 104, ground control circuits 105 which are in turn connected via a common conductor 106 to each of the sources 97. The interrogate control circuits 102 and ground control circuits 105 may comprise any control circuits of the system of which the circuit of FIG. 1 may advantageously comprise a part which control circuits are readily envisioned by one skilled in the art. Accordingly, since these circuits are not necessary to an understanding of the principles of this invention and its practice they are shown in block symbol form only. The interrogate stepping switch 100 is adapted to apply sequentially, positive voltage pulses to the conductors 101 thereby to the probes 91 in a manner and at a time to be described more specifically hereinafter.

Reset control circuitry is represented in FIG. 1 by a reset switch 107 which also provides control for the ground control circuit 105 via a conductor 108. The reset switch 107 is also adapted to provide a negative voltage pulse simultaneously to each of the probes 91 via a plurality of conductors 109 and isolating unilateral conducting elements 110. The reset switch 107 may also comprise a pulse generator readily available in the art which is operative responsive to clock or timing signals appearing in the system of which the embodiment of FIG. 1 may advantageously comprise a part. Accordingly, the switch 107 is also shown only in block symbol form.

The pulse sources 96 may advantageously comprise current pulse sources of any character well known in the art and, in accordance with an illustrative application of the embodiment of FIG. 1, the pulse sources 97 may comprise switching means capable of recurrently closing current paths to a ground potential therethrough. The sources 96 and 97 may advantageously be energized under the control of discrete occurrences within an information handling or data processing system, for example. For this purpose each of the pulse sources 96 and 97 is provided with an input terminal 96′ and 97′, respectively, on which terminals control signals may be applied. In such an application, the circuit of FIG. 1 is highly useful in establishing the correlation between occurrences controlling the two groups of pulse sources 96 and 97. When such occurrences appear wholly at random for each of the two groups of sources 96 and 97, the particular occurrence in the first group which appears most frequently coincidently with a particular occurrence in the second group may readily be determined. The occurrences of each group which appear with lesser frequency of coincidence may also be readily determined by means of the memory device of FIG. 1.

For purposes of describing an illustrative operation of the embodiment of FIG. 1, it will be assumed that the pulse sources 96 are wholly randomly controlled to generate positive current pulses 98. At the same time the sources 97 are wholly randomly controlled to provide intermittent current paths to a ground potential for the pulse 98. By means of the memory pad 90 it will now be possible to establish which of the sources 96 is controlled coincidently with which of the sources 97 to provide coincident current and ground impulses with the greatest frequency. For further purposes of illustration it will be assumed that such a correlation exists between occurrences controlling the pulse source 96 designated B of the first group of sources and the pulse source 97 designated E′ of the second group of sources. At the first coincident occurrence of pulse 98 and the ground pulse provided by the latter sources B and E′, respectively, a current path is provided via the probe $\mathbf{91}_2$, some one of its branches and an electrode 92 affixed thereon, the memory pad 90, and an electrode 92 and branch of the particular probe 93 leading to the ground instantly being applied. Since a path to ground is at this instant being applied via the probe $93_5$, the current pulse 98 is conducted via the branch 91*b* of the probe $91_2$, its terminating electrode 92′, the magnetic strands of the memory pad 90 between the electrode 92′ and the electrode 92″ terminating the branch 93*b* of the probe $93_5$, the latter probe and branch, and the resistor 94 connecting the latter probe with the ground-providing source E′.

Figure 2:
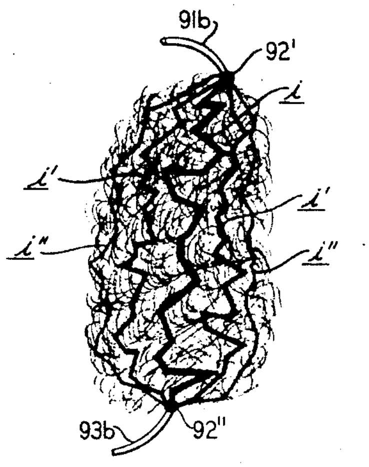
FIG. 2 is a fragmentary portion of the magnetic medium of FIG. 1 between particular electrodes, enlarged for purposes of describing an illustrative operation of the embodiment of FIG. 1.

The current pulse 98 will be conducted between the electrodes 92′ and 92″ through a plurality of parallel paths as presented by the random physical interconnections of the magnetic strands packed between these two electrodes. Since these physical interconnections are wholly random the specific identity of the parallel paths so presented is virtually unascertainable and in accordance with the principles of this invention need not be so ascertained. However, with the first coincidence of a current pulse 98 and a ground pulse applied from the sources B and E′, respectively, a particular path or paths of least resistance will be followed by the pulse 98 and some of the strands forming this path or paths will be partially magnetized while other such strands may be fully remanently magnetized. The paths so magnetized between the electrodes 92′ and 92″ are represented in FIG. 2, which depicts a fragment of the memory pad 90 between the latter electrodes. Thus the heavy erratic line *i* represents each of the current paths followed by the current pulse 98 between the electrodes 92′ and 92″ through the interconnected magnetic strands in which a full remanent flux is induced thereby. However, the current pulse 98 will also be divided among other parallel paths between the electrodes 92′ and 92″ presenting greater resistance. Accordingly, since the current along these paths will be of lesser magnitude, the magnetic strands will be only partially remanently magnetized and these paths are represented in FIG. 2 by the erratic lighter lines *i*′. It will also be appreciated that current paths of still greater resistance will be offered to the current pulse 98 in more remote strands between the electrodes 92′ and 92″. These paths, which will also be partially remanently magnetized but to a lesser degree than the paths *i*′, are represented in FIG. 2 by the erratic lines *i*″. At the termination of the current pulse 98 or at the termination of the coincidence of the pulse 98 and the ground pulse from the source E′, the strands between the electrodes 92′ and 92″ presenting the aforedescribed illustrative current paths will remain remanently magnetized in the degrees as also described in the foregoing. Because of the remanent properties of the magnetic strands these remanent magnetizations will remain regardless of whether or not other current paths are also remanently magnetized in the memory pad 90 between other electrodes 92 pairs or whether or not any further coincidence occurs between a pulse 98 and a ground pulse from the sources B and E′, respectively. Since it may be presumed in the operation of the embodiment of FIG. 1, that other coincidences will occur between pulses from other sources 96 and 97, such remanent magnetizations will in fact be induced between other electrodes 92. In fact such remanent magnetizations may be induced between the electrode 92′ and any other electrode 92 associated with the probes 93 or between the electrode 92″ and any other electrode 92 associated with the probes 91 at the same time that the aforedescribed remanent magnetizations depicted in FIG. 2 exist.

At the second coincidence of a current pulse 98 from the source B and a ground pulse at the source E′, a low impedance path will be presented between the electrodes 92′ and 92″ and, as a result, more of the current paths, such as the paths *i*′ will be remanently magnetized. With successive coincidences of current pulses 98 and ground pulses between the sources B and E′, the current paths existing between the electrodes 92′ and 92″ presented by the interconnected strands will be progressively fully remanently mganetized. Obviously from the aforedescribed magnetization process other current paths between electrodes 92 will also be remanently magnetized in varying degrees as the result of coincidence of current pulses 98 from the sources 96 and ground pulses from the sources 97. This progressive magnetization will be continued until such time as the correlation between the occurrences controlling the energization of the two groups of sources 96 and 97 is to be determined. By progressively remanently magnetizing the paths between the energized electrodes 92 as the result of repetitively applied current pulses 98, the absolute impedance between the electrodes 92 is also progressively decreased. Current paths are thus "learned" between the electrodes 92 as energizing pulses from the sources 96 and 97 are repetitively applied to the probes 91 and 93, respectively. The particular pairs of probes 91 and 93 which have been most frequently coincidently energized and those which have been coincidently energized with progressively less frequency may be determined at any time after a given series of random energizations of the sources 96 and 97, which time may be set as an interrogation time.

This interrogation is accomplished under the control of the interrogate control circuits 102 which, by means of control pulses not specifically depicted in the drawing, operate to control the simultaneous energization of the interrogate pulse source 100 and the ground control circuits 105. The former source is adapted to provide sequential positive interrogate voltage pulses 111 to each of the probes $91_1$ through $91_n$ via the conductors $101_1$ through $101_n$, respectively. At the same time the ground control circuits 105 control via the common conductors 106 the simultaneous energization of the sources 97 to provide a ground for current induced by the voltage pulses 111. As a result of the voltage pulse 111 a read-out current will be induced in the current paths established in the memory pad 90 by the previously applied random coincident current pulses 98, which read-out current in the case of each current path will be of a magnitude as determined by the impedance of each path. The latter impedance in each case will have been set by the extent to which the magnetic strands comprising each path have been remanently magnetized. Thus, the current in each path will vary in accordance with the impedance presented in the paths.

Figure 3:
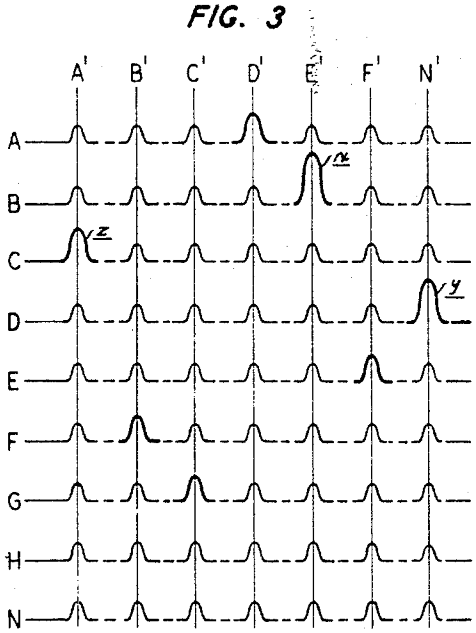
FIG. 3 is a comparison chart showing in idealized form output signals generated during an illustrative interrogation operation of the embodiment of FIG. 1.

The difference in current values in each path may readily be measured by simultaneously observing, by means of suitable detection amplifiers well known in the art, the output signals made available at the terminals 95 each time the voltage pulse 111 is applied to a probe 91. In the illustrative case described in the foregoing, the signal of greatest magnitude will appear at the output terminal $95_5$ at the time the voltage pulse 111 is applied to the conductor $101_2$ and thereby to the probe $91_2$. This follows since, as was explained in the foregoing, the current caused by the pulse 111 sees the least impedance in the memory pad 90 between the electrodes 92′ and 92″ completing a current path between the sources B and E′. In FIG. 3 is shown a typical panel of output signals resulting from the sequential scanning of the probes $91_1$ through $91_n$ associated with the sources A through N, respectively. Thus, the idealized output signals appearing for an illustrative interrogation cycle at each of the terminals 95 associated with the sources A′ through N′ are depicted in the rows, the columns indicating the sequence in which the probes 91 associated with the sources A through N are interrogated. By inspection it may be seen that the current of the greatest magnitude occurs between the sources B and E′, this current being symbolized by the waveform *x*. For purposes of illustration the next greatest current magnitude during the interrogation cycle is shown as occurring between the sources D and N′ and is indicated by the waveform $y$. Other current magnitudes may also be observed in a descending order of magnitude, the next succeeding current value being shown, for example, as occurring between the sources C and A' and indicated as the waveform $z$. Obviously a source 96 such as the source B could also have been energized coincidently in another order of frequency with another source 97 in addition to being energized most frequently coincidently with the source E' as assumed in the foregoing. However, only the simplest order of frequency is depicted in FIG. 3 for purposes of illustration. Thus all of the other current values occurring between all possible pairs of input sources are shown as the same minimal value. It will be appreciated that these current values will in practice also vary as the frequency of coincidence of energization varies.

By identifying the particular probe 91 energized during an interrogation operation at the same time that the terminal 95 carrying the current value of the greatest magnitude is identified, an exact correlation between random occurrences controlling the energization of the two groups of input sources 96 and 97 is readily established. When this correlation has been so established the memory pad 90 may be prepared for another series of random energizations of the sources 96 and 97 and a subsequent correlation established. This is accomplished by restoring the interwoven strands of the memory pad 90 to a uniform magnetic remanence and hence to a uniform impedance.

A number of reset operations may be applied to effect the magnetic restoration and a specific illustrative means for this purpose is depicted in FIG. 1. The reset switch 107 is controlled to apply a negative reset voltage pulse 112 simultaneously to each of the probes 91 via the unilateral conducting elements 110 and the conductors 109. The reset switch 107 also controls, via the conductor 108, the ground control circuits 105 so that the sources 97 are simultaneously energized to provide simultaneous grounds for each of the possible current paths through the memory pad 90. The voltage pulse 112 is of sufficient magnitude such that the currents induced in the paths are effective to switch the remanent magnetizations of all of the magnetic strands making up the current paths regardless of the extent of magnetization. When this flux switching is completed the memory pad 90 is in readiness for a subsequent input cycle of operation.

Figure 4:
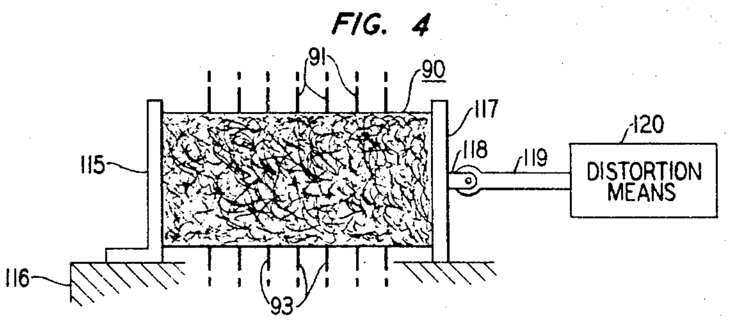
FIG. 4 depicts an alternate reset means applicable in connection with a reset operation of the embodiment of the invention shown in FIG. 1.

In the foregoing description of an illustrative operation of the embodiment of FIG. 1, it will be appreciated that, in order to maintain constant the relative impedances of the current paths presented by the interwoven strands of the pad 90, it is necessary that the physical relationships between the random interconnections of strands not be disturbed. This requirement provides the basis for a novel alternate reset means advantageously employed in connection with the embodiment of FIG. 1. An illustrative arrangement for accomplishing a wholly mechanical restoration of the remanent flux in the memory pad 90 is depicted in FIG. 4. The memory pad 90 having inserted therein probes 91 and 93 is rigidly maintained at one end by retaining means such as an angle piece 115 affixed to a base 116. The retaining means is insulated from the magnetic strands of the pad 90. At the other end, the pad 90 has affixed thereto also in electrical insulation an end plate 117 having a lug 118 affixed thereto. A shaft 119 is movably connected to the lug 118 at one end and is associated at its other end with a distortion means 120. The latter means may comprise any readily devisible means for operating the shaft 119 in such a way as to compress, stretch, twist, or othrewise cause a substantial physical distortion of the pad 90 from its normal configuration. The distortion means 120 may be operated responsive to electrical control circuitry or, in one practical arrangement, may be operated manually. When a reset operation is performed by the reset arrangement of FIG. 4 the physical distortion caused in the memory pad 90 causes a complete disarrangement of the random physical interconnections of the strands making up the pad 90 with the result that the pattern of remanent magnetizations induced during an input phase of operation will be wholly disrupted. The magnetizations remaining after the distortion operation will achieve flux closure through completely random paths which bear no relation to the earlier patterns induced during the input phase. These random magnetizations will be uniformly distributed throughout the memory pad 90 and the current paths "learned" through the memory pad 90 during the input cycle are thus "unlearned" by the physical distortion of the magnetic strands. The pad 90 will now be in readiness for a subsequent input cycle of operation.

In describing an exemplary embodiment of this invention, current and voltage pulses of particular polarities were assumed. It will be understood that these polarities were selected for illustrative purposes only and the arrangements described are readily adapted within the principles of this invention to operate with other currents and voltages than those specifically described. It will further be understood that the illustrative arrangements described may be employed to perform other and different functions and may operate in different contexts. Thus, for example, although current pulses of the same magnitude and ground potential pulses from the sources 96 and 97, respectively, were assumed in the embodiment of FIG. 1, the memory pad 90 is also advantageously employed in determining relative magnitudes of input current pulses of one polarity from the sources 96 and input current pulses of the other polarity from the sources 97 when coincidences of such pulses appear. Thus, the impedance of current paths between electrodes 92 in the memory pad 90 is controllable not only by the repetition of current pulses through the magnetic strands making up the paths, but also by varying the magnitude of the current pulses applied to the memory pad 90.

It is thus to be understood that what has been described are considered to be only specific illustrative embodiments according to the principles of this invention. Accordingly, various and numerous other arrangements may be devised by one skilled in the art without departing from the spirit and scope of this invention.

What is claimed is:

1. An inductive device comprising a body of magnetic material made up of interwoven electrically conductive magnetic strands presenting a plurality of conducting paths between any point of one plurality of points thereon to any point of a second plurality of points thereon, a first plurality of electrodes in electrical contact with said body at said first plurality of points, respectively, a second plurality of electrodes in electrical contact with said body at said second plurality of points, respectively, and means for completing energizing circuits including any one or more of said first plurality of electrodes and any one or more of said second plurality of electrodes for inducing magnetizations in said body between said last-mentioned electrodes of said first plurality of electrodes and said last-mentioned electrodes of said second plurality of electrodes.

2. An inductive device as claimed in claim 1 in which said magnetic material has substantially rectangular hysteresis characteristics and also comprising means for generating voltage pulses in said energizing circuits and means for detecting current values appearing in said energizing circuits responsive to said voltage pulses.

3. An inductive device as claimed in claim 1 in which each of said conducting paths comprises a complex of physically contacting strands of said interwoven strands.

4. An inductive device as claimed in claim 3 in which each electrode of said first and second plurality of electrodes comprises a probe randomly inserted into said body and in electrical contact with the strands thereof only at randomly disposed points therein.

5. An inductive circuit comprising a magnetic body comprising a solid of randomly interwoven magnetic strands of electrically conductive magnetic material capable of being remanently flux saturated, a first electrode in electrical contact with said strands at a first point in said body, a second electrode in electrical contact with said strands at a second point in said body, a third electrode in electrical contact with said strands at a third point in said body, said strands presenting a plurality of parallel conducting paths between said first, second, and third points in said body, means for progressively flux saturating the magnetic strands comprising said conducting paths comprising means for applying a plurality of current pulses across combinations of said first, second, and third electrodes, and means for determining the extent of flux saturation of said conducting paths comprising means for successively applying voltage pulses to said combinations of first, second, and third electrodes and means for detecting current values appearing across said combinations of electrodes responsive to said voltage pulses.

6. A comparison circuit comprising a magnetic body comprising a solid of randomly interwoven magnetic strands of electrically conductive magnetic material capable of being remanently flux saturated, a plurality of first probes each having electrodes thereon in electrical contact with said strands at random points in said body, a plurality of second probes each also having electrodes thereon in electrical contact with said strands at other random points in said body, means for applying first random pulses of one potential to said first probes, and means for applying second random pulses of a second potential to said second probes, coincidences of said first and second pulses between said first and second probes remanently saturating conducting paths between particular electrodes of particular first and second probes to an extent as determined by the frequency of said coincidences.

7. A comparison circuit as claimed in claim 6 also comprising means for subsequently applying interrogate pulses to said first probes in a particular sequence and means for detecting current values in circuits including said first probes, the magnetic strands of said magnetic body, and said second probes, said current values being indicative of said frequency of coincidences of said first and second potential pulses between said particular first and second probes.

8. A comparison circuit as claimed in claim 7 also comprising reset means for subsequently reorienting remanent saturation fluxes in said body.

9. A comparison circuit as claimed in claim 8 in which said reset means comprises means for applying a first reset potential simultaneously to each of said first probes and means for applying a second different reset potential simultaneously to each of said second probes simultaneously with said first reset potential.

10. A comparison circuit as claimed in claim 8 in which said reset means comprises means for physically distorting said magnetic body.

11. A magnetic memory device comprising a magnetic body comprising a solid of randomly interwoven magnetic strands of electrically conductive magnetic material capable of being remanently flux saturated, said strands having a plurality of random interconnections therebetween, a plurality of first probes each having at least one electrode thereon in electrical contact with said strands at a random point in said body, a plurality of second probes each also having at least one electrode thereon in electrical contact with said strands at another random point in said body, said magnetic strands presenting a plurality of parallel conducting paths between each of the electrodes of said first probes and each of the electrodes of said second probes, and a plurality of energizing circuit means each including one of said first probes and one of said second probes selectively energizable for remanently flux saturating a number of parallel magnetic conducting paths between the electrodes of particular first and second probes as determined by the frequency of energization of the energizing circuit means including said last-mentioned first and second probes.

12. A magnetic memory device as claimed in claim 11 also comprising means for subsequently determining said frequency of energization of said energizing circuit means comprising means for applying an interrogate potential pulse to each of said energizing circuit means and means for observing current values appearing in said energizing circuit means responsive to said potential pulses.

13. A magnetic memory device as claimed in claim 12 also comprising means for subsequently changing remanent flux saturations in said body comprising means for applying a reset potential of substantially equal magnitude to each of said energizing circuit means.

14. A magnetic memory device as claimed in claim 12 also comprising means for subsequently changing remanent flux saturations in said body comprising means for physically changing said interconnections of said magnetic strands.

15. A magnetic memory device comprising a magnetic body comprising a solid of randomly interwoven magnetic strands of electrically conductive magnetic material capable of being remanently flux saturated, a plurality of first probes each having at least one electrode thereon in electrical contact with said strands at a random point in said body, a plurality of second probes each also having at least one electrode thereon in electrical contact with said strands at another random point in said body, said magnetic strands presenting a plurality of parallel conducting paths between each of the electrodes of said first probes and each of the electrodes of said second probes, means for storing particular information in said magnetic body comprising a plurality of energizing circuit means each including one of said first probes and one of said second probes and means for differently and selectively energizing said plurality of energizing circuit means for remanently magnetically saturating said plurality of parallel conductive paths, the number and degree of saturation being representative of particular stored information; and means for subsequently interrogating said magnetic body comprising means for applying an interrogate potential pulse to each of said energizing circuit means and means for observing current values appearing in said energizing circuit means, said current values being indicative of said particular stored information.

16. A magnetic memory device as claimed in claim 15 also comprising means for removing said particular information from said magnetic body comprising means for restoring each of said plurality of parallel conducting paths presented in said magnetic strands to random magnetic states.

17. A memory arrangement comprising a plurality of electrical circuits, each of said circuits including a common magnetic body of an electrically conductive magnetic material having substantially rectangular hysteresis characteristics, said common body comprising a solid of randomly interwoven magnetic strands, said strands being randomly physically interconnected to present a complex of parallel conducting paths for completing each circuit for said plurality of electrical circuits, a current pulse source energized responsive to particular input information, and means for controlling the continuity of the circuit responsive to said particular input information concurrently with the energization of said pulse source for inducing a particular remanent magnetization in said common body representative of said particular input information.

18. A memory arrangement as claimed in claim 17 in which each of said plurality of electrical circuits also includes a voltage pulse source and means for detecting the magnitude of current values appearing in the circuit responsive to the energization of said voltage pulse source.

19. An inductive device comprising a body of magnetic material having first and second spaced apart points therein and made up of interwoven electrically conductive magnetic strands, and an energizing circuit connected to a portion of said body at said first and second points for inducing magnetizations in said body between said first and second points.

20. An inductive device as claimed in claim 19 in which said magnetic material has substantially rectangular hysteresis characteristics and also comprising means for generating a voltage pulse in said energizing circuit and means for detecting current values appearing in said energizing circuit responsive to said voltage pulse.

21. An inductive device as claimed in claim 20 in which a conducting path between said first and second points in said body comprises a complex of physically contacting strands of said interwoven strands.

22. An inductive device as claimed in claim 21 in which said energizing circuit includes a first and second electrode randomly inserted into said body and in electrical contact with the strands thereof at said first and second points, respectively.

23. A memory device comprising a body of interconnected electrically conductive magnetic strands, said strands having substantially rectangular hysteresis characteristics, at least one energizing circuit for inducing a remanent magnetization in a conducting path in said body, said circuit connected to first and second electrodes in electrical contact with the strands of said body at the origin and termination of said conducting path, and reset means physically distorting said magnetic body for subsequently reorienting said remanent magnetization in said body.

References Cited

UNITED STATES PATENTS

| | | | |
|---|---|---|---|
| 2,920,317 | 1/1860 | Mallery. | |
| 3,011,158 | 11/1961 | Rogers. | |
| 3,067,408 | 12/1962 | Barrett. | |
| 3,069,661 | 12/1962 | Gianola. | |
| 2,887,454 | 5/1959 | Toulmin. | |
| 3,083,353 | 3/1963 | Bobeck | 340—174 |
| 3,099,874 | 8/1963 | Schweizerhof. | |
| 3,100,295 | 8/1963 | Schweizerhof | 340—174 |
| 3,300,767 | 1/1967 | Davis et al. | 340—174 |

STANLEY M. URYNOWICZ, Jr., Primary Examiner